United States Patent
Onodera et al.

(10) Patent No.: US 11,773,982 B2
(45) Date of Patent: Oct. 3, 2023

(54) SEALING DEVICE

(71) Applicant: NOK CORPORATION, Tokyo (JP)

(72) Inventors: Hiroshi Onodera, Fukushima (JP);
Nobuhiro Nishimura, Fukushima (JP);
Masamichi Kishiro, Fukushima (JP)

(73) Assignee: NOK CORPORATION, Tokyo (JP)

( * ) Notice: Subject to any disclaimer, the term of this patent is extended or adjusted under 35 U.S.C. 154(b) by 89 days.

(21) Appl. No.: 17/611,250

(22) PCT Filed: Apr. 24, 2020

(86) PCT No.: PCT/JP2020/017591
§ 371 (c)(1),
(2) Date: Nov. 15, 2021

(87) PCT Pub. No.: WO2020/250578
PCT Pub. Date: Dec. 17, 2020

(65) Prior Publication Data
US 2022/0299115 A1    Sep. 22, 2022

(30) Foreign Application Priority Data

Jun. 12, 2019 (JP) ................. 2019-109676

(51) Int. Cl.
*F16J 15/3232* (2016.01)
*F16J 15/16* (2006.01)
(Continued)

(52) U.S. Cl.
CPC ......... *F16J 15/3232* (2013.01); *F16J 15/164* (2013.01); *F16J 15/56* (2013.01); *F16J 15/3276* (2013.01)

(58) Field of Classification Search
CPC .... F16J 15/00; F16J 15/16; F16J 15/50; F16J 15/52; F16J 15/164; F16J 15/32;
(Continued)

(56) References Cited

U.S. PATENT DOCUMENTS 4,522,411 A    6/1985    Burgan
2003/0184021 A1*  10/2003  Hatch ................. F16J 15/3228
277/395
(Continued)

FOREIGN PATENT DOCUMENTS

EP    2647890 A2    10/2013
EP    2647890 A3     4/2014
(Continued)

OTHER PUBLICATIONS

Calleja et al., Where is the glass transition temperature of poly (tetrafluoroethylene)? (Year: 2013).*
(Continued)

*Primary Examiner* — Nathan Cumar
(74) *Attorney, Agent, or Firm* — GREENBLUM & BERNSTEIN, P.L.C.

(57) ABSTRACT

A sealing device that is adapted to be disposed between a reciprocating shaft and an inner peripheral surface of a shaft hole in which the reciprocating shaft is disposed, and that separates an oil side from an atmosphere side, includes an annular oil seal made of a resin, an oil-side rigid ring made of a metal, an elastomeric annular dust seal, and an atmospheric-side rigid ring made of a metal. The oil seal has an oil lip adapted to be in slidable contact with the reciprocating shaft and is formed of a resin having a glass transition temperature of 80 degrees Celsius or higher. The oil-side rigid ring is disposed around the oil seal and supports the oil seal. The dust seal is disposed on the atmosphere side of the oil seal and has a dust lip adapted to be in slidable contact with the reciprocating shaft.

7 Claims, 3 Drawing Sheets

(51) Int. Cl.
*F16J 15/56* (2006.01)
*F16J 15/3276* (2016.01)

(58) Field of Classification Search
CPC .. F16J 15/3204; F16J 15/3208; F16J 15/3212; F16J 15/3216; F16J 15/322; F16J 15/3228; F16J 15/3268; F16J 15/3272; F16J 15/3276; F16J 15/56
USPC .......................................................... 277/562
See application file for complete search history.

(56) References Cited

U.S. PATENT DOCUMENTS

| 2010/0084824 | A1* | 4/2010 | Horiba ..................... F16J 15/56 277/556 |
| 2011/0140369 | A1* | 6/2011 | Lenhert ................ F16J 15/3252 277/589 |
| 2014/0097572 | A1 | 4/2014 | Hatch |

FOREIGN PATENT DOCUMENTS

| JP | 43-15623 | 6/1968 |
| JP | 2000-130599 | 5/2000 |
| JP | 2001-141071 | 5/2001 |
| JP | 2006-300191 | 11/2006 |
| JP | 2008-57756 | 3/2008 |
| JP | 2010-255641 | 11/2010 |
| JP | 2015-38379 | 2/2015 |

OTHER PUBLICATIONS

G. Calleja et al., "Where is the glass transition temperature of poly(tetrafluoroethylene)? A new approach by dynamic rheometry and mechanical tests" European Polymer Journal 49 (2013) pp. 2214-2222.
Extended European Search Report issued in European Patent Application No. 20822505.2-1015 dated Jun. 7, 2022.
International Search Report issued in International Bureau of WIPO Patent Application No. PCT/JP2020/017591, dated Jun. 23, 2020.

* cited by examiner

SEALING DEVICE

TECHNICAL FIELD

The present invention relates to sealing devices disposed between reciprocating shafts and inner peripheral surfaces of shaft holes in which the reciprocating shafts are disposed.

BACKGROUND ART

In a machine having a reciprocating shaft, such as a hydraulic cylinder apparatus and a shock absorber, a sealing device is provided between the reciprocating shaft and the inner peripheral surface of the shaft hole to seal an annular gap therebetween.

Patent Document 1 discloses a sealing device for a shock absorber of a vehicle suspension system. This sealing device includes an elastic body in which a seal lip and a dust lip are formed, a metal ring adhering to the elastic body, and a lid member laminated on the metal ring. The metal ring has multiple through holes for weight reduction thereof.

BACKGROUND DOCUMENT(S)

Patent Document(s)

JP-A-2010-255641

SUMMARY OF THE INVENTION

A sealing device for a device having a reciprocating shaft may be used in the future in an environment with higher pressure and higher temperature. There is a demand for a sealing device that has high durability even when used in a high pressure and high temperature environment and can ensure high sealing ability.

Accordingly, the present invention provides a sealing device having a high durability even when used in an environment of high pressure and high temperature.

A sealing device according to an aspect of the present invention is a sealing device adapted to be disposed between a reciprocating shaft and an inner peripheral surface of a shaft hole in which the reciprocating shaft is disposed, the sealing device separating an oil side from an atmosphere side. The sealing device includes an annular oil seal made of a resin having an oil lip adapted to be in slidable contact with the reciprocating shaft and having a glass transition temperature of 80 degrees Celsius or higher; an oil-side rigid ring made of a metal disposed around the oil seal and supporting the oil seal; an annular dust seal made of an elastomer and disposed on the atmosphere side of the oil seal, the annular dust seal having a dust lip adapted to be in slidable contact with the reciprocating shaft; and an atmosphere-side rigid ring made of a metal disposed around the dust seal and supporting the dust seal.

According to this aspect, since the oil seal adapted to be in contact with the reciprocating shaft is formed of a resin having a glass transition temperature of 80 degrees Celsius or higher, the oil seal has higher heat resistance, higher pressure resistance, and higher wear resistance than those of an oil seal formed of an elastomer. Therefore, the sealing device has high durability.

DESCRIPTION OF EMBODIMENTS

Hereinafter, with reference to the accompanying drawings, according to the present invention various embodiments will be described. It is of note that the drawings are not necessarily to scale, and certain features may be exaggerated or omitted.

First Embodiment

Figure 1:
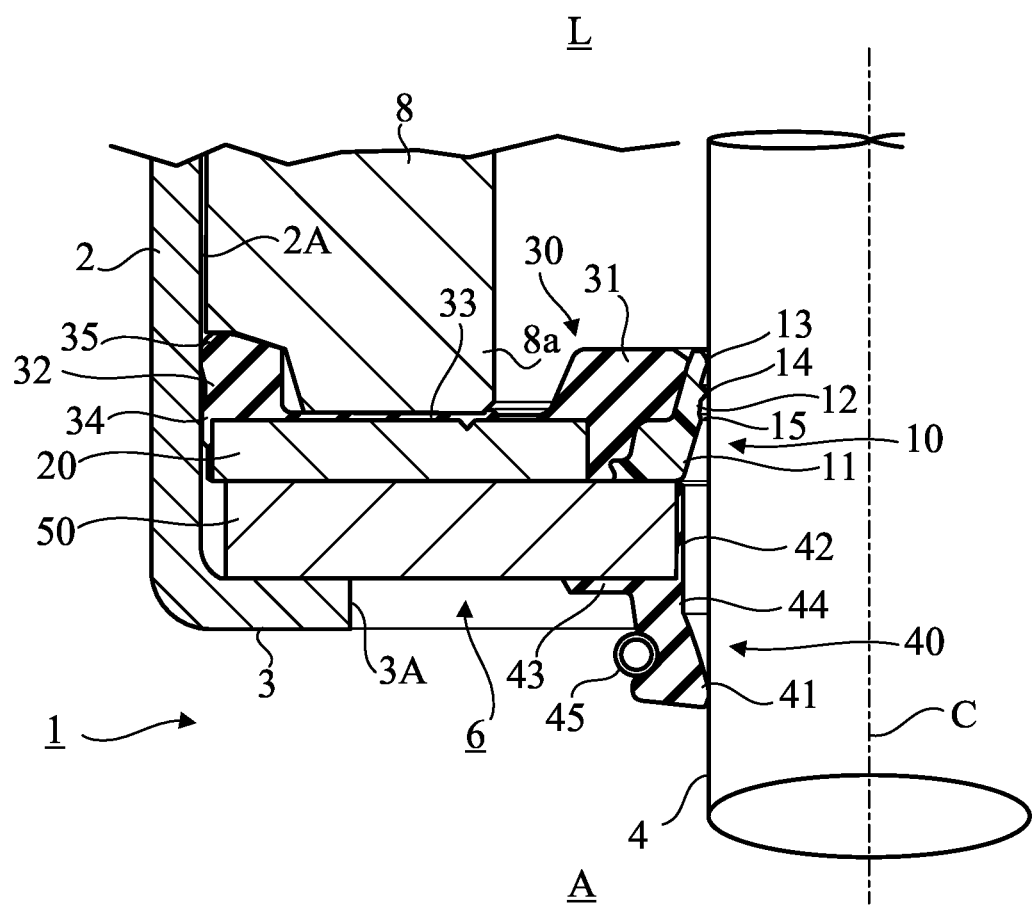
FIG. 1 is a cross-sectional view of a sealing device in use according to a first embodiment of the present invention.

FIG. 1 illustrates a first embodiment of the present invention, showing parts of a shock absorber, which is an apparatus having a reciprocating shaft, and a sealing device in use provided for the shock absorber.

The shock absorber 1 includes a cylindrical housing 2 and a cylindrical reciprocating shaft 4. The housing 2 is cylindrical and has a shaft hole 2A in which the reciprocating shaft 4 is disposed. A fluid, namely oil L, is contained in the shaft hole 2A. At the lower end of the housing 2, an end wall 3 having an opening 3A formed at the center thereof is formed.

A sealing device 6, which is an oil seal, and a rod guide 8 are arranged inside the housing 2. Although not shown in detail, the rod guide 8 is fixed to the housing 2. The rod guide 8 guides the reciprocating motion of the reciprocating shaft 4 in the vertical direction in the figure (i.e., in the axial direction of the reciprocating shaft 4) and presses the sealing device 6 against the end wall 3.

The sealing device 6 is disposed inside the housing 2, and the movement of the sealing device 6 in the transverse direction in the figure is restricted by the inner peripheral surface of the housing 2. The sealing device 6 is sandwiched between a protrusion 8a of the rod guide 8 and the end wall 3, and the movement of the sealing device 6 along the axial direction of the reciprocating shaft 4 is restricted. The sealing device 6 is disposed between the reciprocating shaft 4 and the inner peripheral surface of the shaft hole 2A in which the reciprocating shaft 4 is disposed, separating the side of oil L from the side of atmosphere A, and preventing or reducing leakage of oil L from the side of oil L to the side of atmosphere A.

The reciprocating shaft 4 is cylindrical, the shaft hole 2A is circular in cross-section, and the sealing device 6 is approximately annular, but only the left half parts thereof are shown in FIG. 1. In FIG. 1, the common central axis C of the reciprocating shaft 4, the shaft hole 2A, and the sealing device 6 is shown.

The sealing device 6 includes an annular oil seal 10, an oil-side rigid ring 20, an elastic ring 30, an annular dust seal 40, and an atmosphere-side rigid ring 50.

The oil seal 10 includes an atmosphere-side annular portion 11 and an oil-side annular portion 12. The oil-side annular portion 12 has a thickness (difference between the outer radius and the inner radius) that is less than the thickness of the atmosphere-side annular portion 11. The atmosphere-side annular portion 11 is not in contact with the reciprocating shaft 4, whereas the oil-side annular portion 12 has multiple oil lips 13, 14, and 15 that can be in slidable contact with the reciprocating shaft 4.

The oil seal 10 is formed of a resin. A preferred resin as the material for the oil seal 10 is a resin having a low coefficient of friction and high hardness, such as polyether ether ketone (PEEK), polyphenylene sulfide (PPS), and polytetrafluoroethylene (PTFE). However, other resins may also be used as the material for the oil seal 10. The resin may be blended with a filler and/or other components.

The glass transition temperature of the material of the oil seal 10 is 80 degrees Celsius or higher.

The oil-side rigid ring 20 is a circular ring formed of a metal, for example, a steel. The oil-side rigid ring 20 is disposed around the oil seal 10, coaxially with the oil seal 10. The oil-side rigid ring 20 supports the oil seal 10 and the elastic ring 30.

The elastic ring 30 is formed of an elastomer. The glass transition temperature of the material of the elastic ring 30 is equal to or less than 0 degrees Celsius.

The elastic ring 30 is disposed around the oil seal 10, coaxially with the oil seal 10. The elastic ring 30 has an inner annular portion 31, an outer annular portion 32, and a connecting annular portion 33.

The inner annular portion 31 is fixedly adhered to the inner periphery surface and the oil side surface of the oil-side rigid ring 20. The inner annular portion 31 is a portion that reinforces the oil seal 10 and permits displacement of the oil seal 10. The outer periphery of the oil seal 10 is fitted into the inner periphery of the inner annular portion 31. Accordingly, the outer periphery of the oil seal 10 is attached to the inner annular portion 31.

The outer annular portion 32 is adhered to the outer periphery surface and the oil side surface of the oil-side rigid ring 20. The outer annular portion 32 is a portion that improves sealing ability of the sealing device 6 for the oil. The outer annular portion 32 has outer gasket portions 34 and 35.

The outer gasket portion 34 is an annular protrusion protruding radially outward from the portion of the outer annular portion 32 that covers the outer peripheral surface of the oil-side rigid ring 20. The outer gasket portion 34 is in contact with the inner peripheral surface of the shaft hole 2A of the housing 2 in a compressed state. Accordingly, the outer gasket portion 34 is tightly fitted (press-fitted) into the shaft hole 2A.

The outer gasket portion 35 is disposed on the oil side more than the outer gasket portion 34 and is an annular protrusion protruding radially outward. The outer gasket portion 35 is also in contact with the inner peripheral surface of the shaft hole 2A of the housing 2 in a compressed state. As enlarged in FIG. 2, the diameter of the outer gasket portion 35 is greater than that of the outer gasket portion 34 in a case in which the sealing device 6 is not deployed in the shaft hole 2A. Therefore, the interference of the outer gasket portion 35 is greater than that of the outer gasket portion 34.

The oil-side rigid ring 20 provides a support force to the outer gasket portions 34 and 35 radially outward, that is, toward the inner peripheral surface of the shaft hole 2A, so that the outer gasket portion 34 is compressed by the inner peripheral surface of the shaft hole 2A and the oil-side rigid ring 20, and the outer gasket portion 35 is compressed by the inner peripheral surface of the shaft hole 2A, the protrusion 8a of the rod guide 8, and the oil-side rigid ring 20. In this way, the outer gasket portions 34 and 35 prevent or reduce leakage of oil L through the outer portion of the shaft hole 2A from the oil side to the atmosphere side.

The connecting annular portion 33 connects the inner annular portion 31 with the outer annular portion 32. The connecting annular portion 33 is fixedly adhered to the oil-side surface of the oil-side rigid ring 20. The protrusion 8a of the rod guide 8 is brought into contact with the connecting annular portion 33 and exerts a pressing force on the sealing device 6 toward the end wall 3 of the housing 2. Thus, the sealing device 6 is sandwiched between the rod guide 8 and the end wall 3 and is fixed in position.

The dust seal 40 is disposed on the atmosphere side for the oil seal 10. The dust seal 40 is formed of an elastomer. The glass transition temperature of the material of the dust seal 40 is equal to or less than 0 degrees Celsius. The material of the dust seal 40 may be the same as or different from the material of the elastic ring 30.

The dust seal 40 has a dust lip 41 that is adapted to be in slidable contact with the reciprocating shaft 4.

The atmosphere-side rigid ring 50 is a circular ring formed of a metal, for example, a steel. The material of the atmosphere-side rigid ring 50 may be the same as or different from the material of the oil-side rigid ring 20. The atmosphere-side rigid ring 50 is disposed around the dust seal 40, coaxially with the dust seal 40. The atmosphere-side rigid ring 50 supports the dust seal 40.

The atmosphere side surface of the atmosphere-side rigid ring 50 is adapted to be brought into contact with the end wall 3 of the housing 2. The oil side surface of the atmosphere-side rigid ring 50 is brought into contact with the atmosphere side surface of the oil-side rigid ring 20.

The dust seal 40 is fixedly adhered to the atmosphere-side rigid ring 50. More specifically, the dust seal 40 has an annular portion 42 fixedly adhered to the inner peripheral surface of the atmosphere-side rigid ring 50 and another annular portion 43 fixedly adhered to the atmosphere side surface of the atmosphere-side rigid ring 50.

The dust seal 40 further has an atmosphere-side annular portion 44 that extends from the annular portions 42 and 43 toward the atmosphere side. A dust lip 41 is provided at the distal end of the atmosphere-side annular portion 44.

Figure 2:
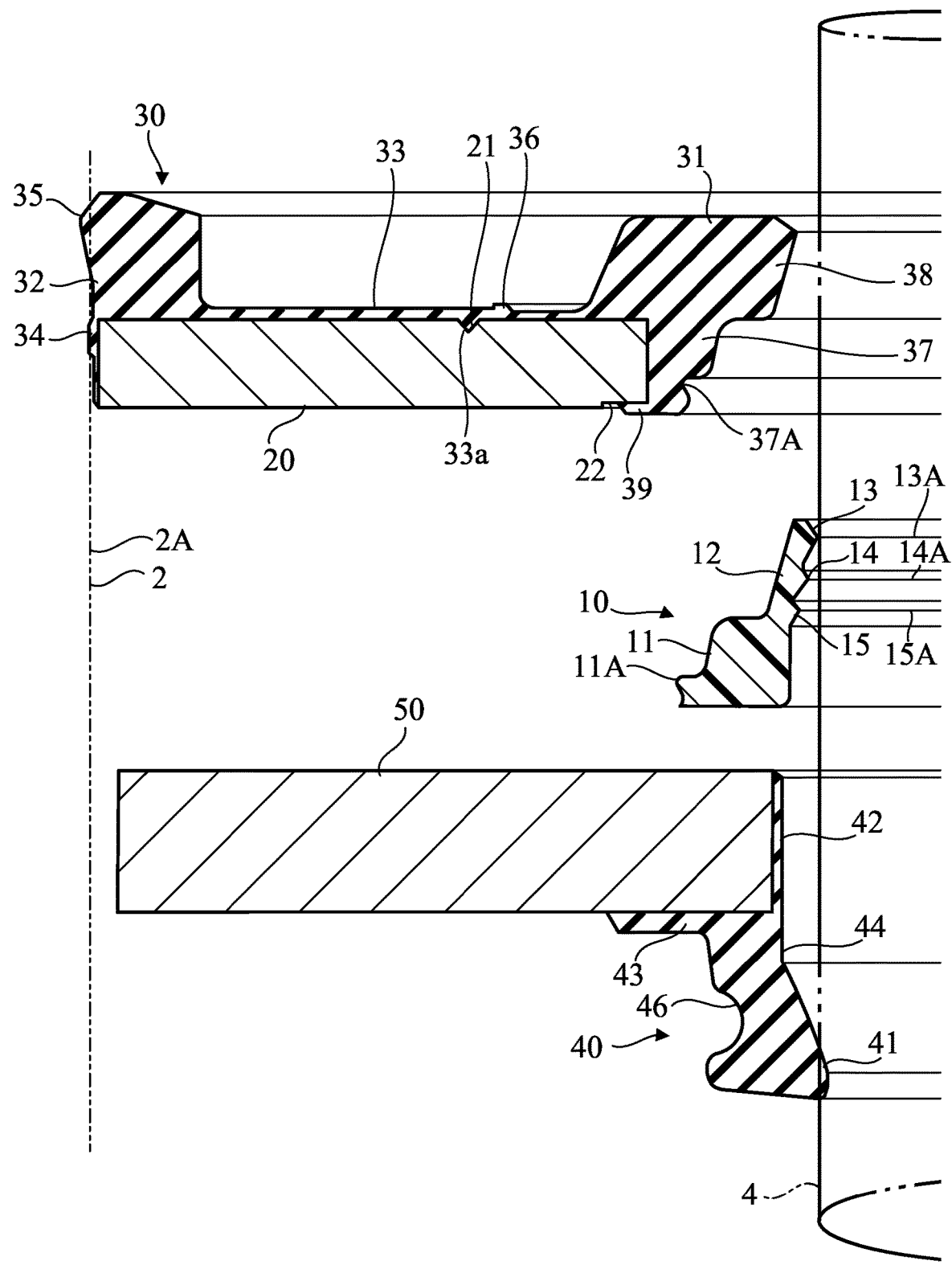
FIG. 2 is an enlarged exploded cross-sectional view of the sealing device of FIG. 1 when not in use.

Although not absolutely necessary, a garter spring 45 is wound around the atmosphere-side annular portion 44 to compress the dust lip 41 radially inward. The garter spring 45 provides the atmosphere-side annular portion 44 with a force to press the dust lip 41 against the reciprocating shaft 4. As shown in FIG. 2, a circumferential groove 46 is formed on the outer circumferential surface of the atmosphere-side annular portion 44 to receive the garter spring 45.

According to the sealing device 6, since the oil seal 10 adapted to be in contact with the reciprocating shaft 4 is formed of a resin having a glass transition temperature of 80 degrees Celsius or higher, the oil seal 10 has higher heat resistance, higher pressure resistance, and higher wear resistance than those of an oil seal formed of an elastomer. Therefore, the sealing device 6 has high durability.

The oil seal 10 formed of resin is less likely to elastically deform than an oil seal formed of elastomer. Particularly, in a low-temperature environment (e.g., an environment of −20 degrees Celsius or lower), resin becomes very hard. However, according to the sealing device 6, since the elastomeric elastic ring 30 is arranged around the oil seal 10, the oil seal 10 is pressed radially inward by the elastic ring 30, and even when the oil-side rigid ring 20 and the reciprocating shaft 4 are eccentric to each other, the oil lips can deform following the outer peripheral surface of the reciprocating shaft 4, and the sealing device 6 has high sealing ability. In particular, this advantage is useful in a low-temperature environment.

FIG. 2 is an enlarged exploded cross-sectional view of the sealing device 6 when it is not in use, i.e., when it is not deployed in the shock absorber 1. However, in FIG. 2, the positions of the shaft hole 2A of the housing 2 and the reciprocating shaft 4 when the sealing device 6 is deployed in the shock absorber 1 are indicated by phantom lines.

As shown in FIG. 2, the sealing device 6 can be disassembled into three parts: one part is the oil seal 10, another part is a combination of the oil-side rigid ring 20 and the elastic ring 30, and yet another part is a combination of the dust seal 40 and the atmosphere-side rigid ring 50.

Referring to FIG. 2, details of the sealing device 6 will be further described.

A circumferentially continuous groove 21 is formed on the oil side surface of the oil-side rigid ring 20, and a portion 33a of the connecting annular portion 33 of the elastic ring 30 is embedded in the groove 21.

Although not absolutely necessary, a side lip 36 is formed on the connecting annular portion 33 of the elastic ring 30. The side lip 36 is a plate extending toward the oil side, and the distal end of the side lip 36 is brought into contact with the protrusion 8a of the rod guide 8 to prevent or reduce oil from entering between the protrusion 8a and the connecting annular portion 33.

The inner annular portion 31 of the elastic ring 30 has an atmospheric-side annular portion 37 fixedly adhered to the inner peripheral surface of the oil-side rigid ring 20, and an oil-side annular portion 38 protruding from the atmospheric-side annular portion 37 toward the oil side. The atmosphere-side annular portion 11 of the oil seal 10 is press-fitted into the atmosphere-side annular portion 37 of the elastic ring 30, and the oil-side annular portion 12 of the oil seal 10 is press-fitted into the oil-side annular portion 38 of the elastic ring 30. In this manner, the oil seal 10 is press-fitted into the elastic ring 30 and fixed to the elastic ring 30. If the oil seal 10 is fitted into the elastic ring 30 with appropriate pressure, the oil seal 10 can be more firmly fixed to the elastic ring 30 compared to a case in which the oil seal is glued to the elastic ring, and the durability of the sealing device 6 can be improved.

A circumferential groove 37A is formed on the inner peripheral surface of the atmosphere-side annular portion 37, whereas an annular protrusion 11A is formed on the outer peripheral surface of the atmosphere-side annular portion 11 of the oil seal 10. The annular protrusion 11A is fitted into the circumferential groove 37A, so that the oil seal 10 is fixed to the inner annular portion 31.

However, the outer periphery of the oil seal 10 may be fixed to the inner annular portion 31 by an adhesive. In this case, the annular protrusion 11A and the circumferential groove 37A may or may not be formed.

In the oil seal 10 made of resin with small elasticity, the oil-side annular portion 12 having the oil lips 13, 14, and 15 has a smaller thickness (difference between the outer radius and the inner radius) and therefore has smaller rigidity than that of the atmosphere-side annular portion 11, so that the oil-side annular portion 12 is more easily elastically deformed than the atmosphere-side annular portion 11. In the elastic ring 30 made of elastomer with high elasticity, the atmosphere-side annular portion 37 is directly supported by the oil-side rigid ring 20, and the oil-side annular portion 38 has a greater thickness (difference between the outer radius and the inner radius) than that of the atmosphere-side annular portion 37, so that the oil-side annular portion 12 of the oil seal 10 surrounded by the oil-side annular portion 38 can be more easily elastically deformed than the atmosphere-side annular portion 11 surrounded by the atmosphere-side annular portion 37.

In addition, the inner annular portion 31 has an annular protrusion 39 that protrudes toward the atmosphere side more than the atmosphere-side annular portion 37. The annular protrusion 39 is fixedly adhered to the oil-side rigid ring 20 at a circumferential groove 22 formed on the inner periphery of the atmosphere side surface of the oil-side rigid ring 20. The annular protrusion 39 protrudes toward the atmosphere side more than the atmosphere side surface of the oil-side rigid ring 20. When the three components (the oil seal 10, the combination of the oil-side rigid ring 20 and the elastic ring 30, and the combination of the dust seal 40 and atmosphere-side rigid ring 50) are assembled and when the oil-side rigid ring 20 is brought into contact with the atmosphere-side rigid ring 50, the annular protrusion 39 is compressed by the oil-side rigid ring 20 and the atmosphere-side rigid ring 50, so as to prevent or reduce ingress of oil between the oil-side rigid ring 20 and the atmosphere-side rigid ring 50.

In the oil seal 10, each of the oil lips 13, 14, and 15 is a circular ring that tapers radially inward. More specifically, the oil lip 13 has a lip edge 13A that is the boundary of two inclined surfaces of truncated cone shapes. The oil lip 14 also has a lip edge 14A that is the boundary of two inclined surfaces of truncated cone shapes. The oil lip 15 also has a lip edge 15A that is the boundary of two inclined surfaces of truncated cone shapes. The lip edges 13A, 14A, and 15A are coaxially arranged and encircle the reciprocating shaft 4 all around.

In a no-load state in which the oil seal 10 is not disposed around the reciprocating shaft 4, the diameter of the lip edge 13A of the oil lip 13 disposed on the most oil side is less than the diameter of the lip edge 14A of the oil lip 14 disposed in the middle, and the diameter of the lip edge 14A of the oil lip 14 disposed in the middle is less than the diameter of the lip edge 15A of the oil lip 15 disposed on the most atmosphere side.

Since the oil-side annular portion 12 of the oil seal 10 formed of resin has a thickness less than that of the atmosphere-side annular portion 11, the oil-side annular portion 12 having oil lips 13, 14, and 15 is more easily elastically deformed than the atmosphere-side annular portion 11, and the oil lips disposed on the oil side is more easily elastically deformed than the oil lip disposed on the atmosphere side. In the no-load state (state shown in FIG. 2) in which the oil seal 10 is not disposed around the reciprocating shaft 4, the diameter of the lip edge of the oil lip disposed on the oil side is less than the diameter of the lip edge of the oil lip disposed on the atmosphere side, so that in the load state (state shown in FIG. 1) in which the oil seal 10 is disposed around the reciprocating shaft 4, the lip edges of the oil lips have similar diameters. Therefore, the lip edges of these oil lips are provided with approximately equal pressure from the reciprocating shaft 4, and excessive wear caused by pressure concentration is reduced.

In FIG. 1, the oil lips 13 and 14 are in contact with the reciprocating shaft 4, but the oil lip 15 is not in contact with the reciprocating shaft 4. However, even in this state, the lip edges 13A and 14A of the two oil lips 13 and 14 are given approximately equal pressure from the reciprocating shaft 4, and excessive wear caused by pressure concentration is reduced. If abrasion of the lip edges 13A and 14A progresses, the lip edges 13A, 14A, and 15A of the three oil lips 13, 14, and 15 are given approximately equal pressure from the reciprocating shaft 4, and excessive wear caused by pressure concentration is reduced.

In view of the abrasion of the oil lips 13, 14, and 15, the distance between the outer peripheral surface of the oil seal 10 and each lip edge should be greater than 0.5 mm. However, if the thickness of the oil-side annular portion 12 is too large, it will be difficult for the oil-side annular portion 12 to deform elastically. Accordingly, the thickness of the oil-side annular portion 12 is limited to some extent.

Second Embodiment

Figure 3:
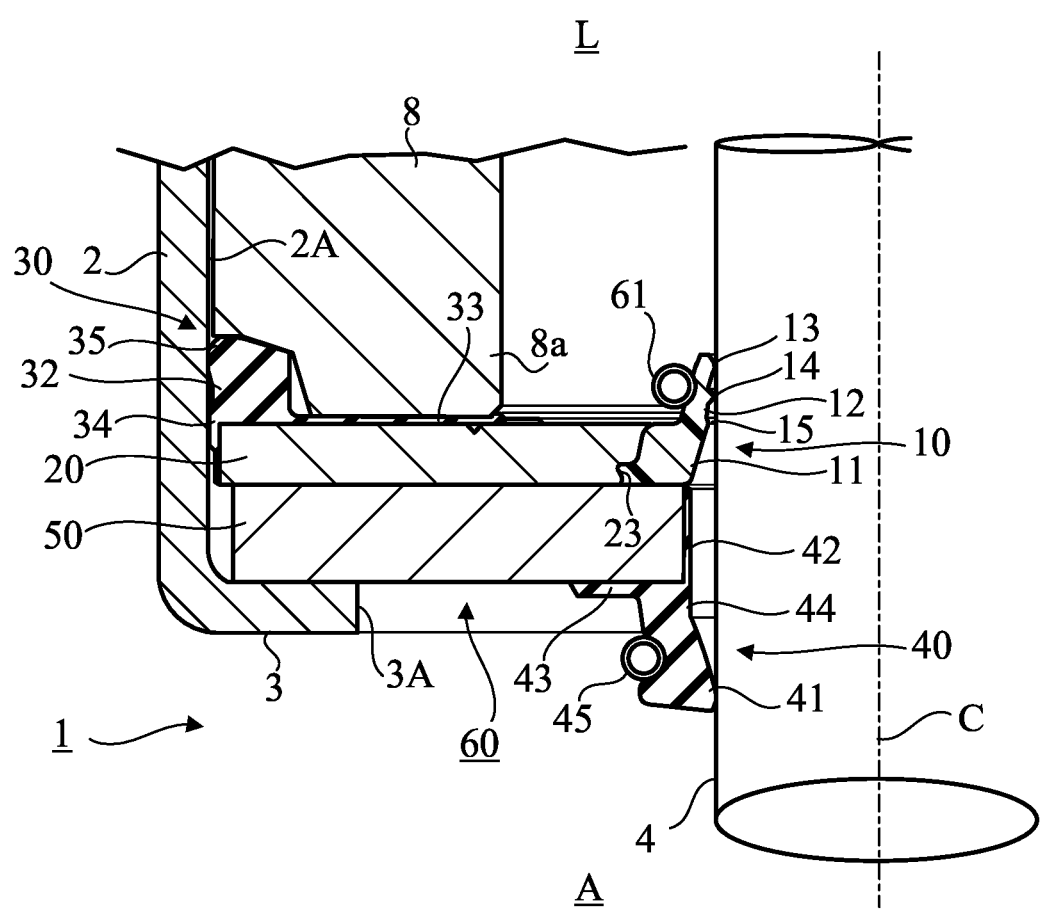
FIG. 3 is a cross-sectional view of a sealing device in use according to a second embodiment of the present invention.

FIG. 3 illustrates a second embodiment of the present invention, showing parts of a shock absorber, which is an apparatus having a reciprocating shaft, and a sealing device in use provided in the shock absorber. In FIG. 3, the same reference symbols are used for identifying components that are the same as those in the first embodiment, and those components will not be described in detail.

In the sealing device 60 of this embodiment, the elastic ring 30 does not have an inner annular portion 31, and the oil seal 10 is in direct contact with the oil-side rigid ring 20 and is directly supported by the oil-side rigid ring 20.

The atmosphere-side annular portion 11 of the oil seal 10 is press-fitted into the inner peripheral surface of the oil-side rigid ring 20. The inner peripheral surface of the oil-side rigid ring 20 has a shape that conforms to the atmospheric-side annular portion 11, and has a circumferential groove 23 into which the annular protrusion 11A (see FIG. 2) of the atmospheric-side annular portion 11 is fitted. Thus, the oil seal 10 is fixed to the oil-side rigid ring 20. If the oil seal 10 is fitted into the oil-side rigid ring 20 with appropriate pressure, the oil seal 10 can be more firmly fixed to the oil-side rigid ring 20 compared to a case in which the oil seal is glued to the oil-side rigid ring, and durability of the sealing device 60 can be improved.

However, the outer periphery of the oil seal 10 may be fixed to the oil-side rigid ring 20 by an adhesive. In this case, the annular protrusion 11A and the circumferential groove 23 may or may not be formed.

Although not absolutely necessary, in this embodiment, at least one garter spring 61 is wound around the oil-side annular portion 12 of the oil seal 10 to compress the oil lips 13, 14, and 15 radially inward. The garter spring 61 exerts a force on the oil-side annular portion 12 to press the oil lips 13, 14, and 15 against the reciprocating shaft 4. A circumferential groove is formed on the outer peripheral surface of the oil-side annular portion 12 to receive the garter spring 61.

According to the sealing device 60, since the garter spring 61 is disposed around the oil seal 10, the oil seal 10 is pressed radially inward by the garter spring 61, and even when the oil-side rigid ring 20 and the reciprocating shaft 4 are eccentric to each other, the oil lips can deform following the outer peripheral surface of the reciprocating shaft 4, and the sealing device 60 has high sealing ability. In particular, this advantage is useful in a low-temperature environment.

Other Variations

Although the invention has been illustrated and described above with reference to preferred embodiments of the invention, it will be understood by those skilled in the art that changes in form and detail are possible without departing from the scope of the invention described in the claims. Such changes, alterations and modifications should be encompassed within the scope of the present invention.

For example, the present invention is not limited to use in shock absorbers, but may also be applied to sealing devices used in other apparatuses having reciprocating shafts, such as hydraulic cylinder apparatuses, fuel pumps, and the like.

The number of oil lips of the oil seal may be two, or four or more.

Aspects of the present invention are also set out in the following numbered clauses:

Clause 1. A sealing device adapted to be disposed between a reciprocating shaft and an inner peripheral surface of a shaft hole in which the reciprocating shaft is disposed, the sealing device separating an oil side from an atmosphere side, the sealing device including:

an annular oil seal made of a resin having an oil lip adapted to be in slidable contact with the reciprocating shaft and having a glass transition temperature of 80 degrees Celsius or higher;

an oil-side rigid ring made of a metal disposed around the oil seal and supporting the oil seal;

an annular dust seal made of an elastomer and disposed on the atmosphere side of the oil seal, the annular dust seal having a dust lip adapted to be in slidable contact with the reciprocating shaft; and an atmosphere-side rigid ring made of a metal disposed around the dust seal and supporting the dust seal.

Clause 2. The sealing device according to clause 1, wherein the oil seal has an atmosphere-side annular portion and an oil-side annular portion, the oil-side annular portion having a thickness less than that of the atmosphere-side annular portion, the atmosphere-side annular portion adapted to be not in contact with the reciprocating shaft, the oil-side annular portion having multiple oil lips adapted to be in slidable contact with the reciprocating shaft, each of the oil lips is a circular ring tapering radially inward and having a lip edge, the lip edges of the oil lips being coaxially arranged, a diameter of a lip edge of the oil lip arranged on the oil side being less than a diameter of a lip edge of the oil lip arranged on the atmosphere side in a no-load state in which the oil seal is not arranged around the reciprocating shaft.

According to this clause, since the oil-side annular portion of the oil seal formed of resin has a thickness that is less than the thickness of the atmosphere-side annular portion, the oil-side annular portion having oil lips is more easily elastically deformed than the atmosphere-side annular portion, and the oil lips disposed on the oil side is displaced more easily than the oil lip disposed on the atmosphere side. In the no-load state in which the oil seal is not disposed around the reciprocating shaft, the diameter of the lip edge of the oil lip disposed on the oil side is less than the diameter of the lip edge of the oil lip disposed on the atmosphere-side, so that in a loaded state in which an oil seal is disposed around the reciprocating shaft, the lip edges have similar diameters. Therefore, the lip edges of these oil lips are subjected to approximately equal pressure from the reciprocating shaft, and excessive wear caused by pressure concentration is reduced.

Clause 3. The sealing device according to clause 1 or 2, further including an elastomeric elastic ring fixedly adhered to an inner periphery of the oil-side rigid ring, an outer periphery of the oil seal being attached to the elastic ring.

The oil seal formed of resin is less likely to elastically deform than an oil seal formed of elastomer. Particularly in a low temperature environment (e.g., below −20 degrees Celsius), the resin becomes very hard. However, according to this clause, since the elastomeric elastic ring is disposed around the oil seal, the oil seal is pressed radially inward by the elastic ring, and even when the oil-side rigid ring and the reciprocating shaft are eccentric to each other, the oil lip can deform following the outer peripheral surface of the reciprocating shaft, and the sealing device has high sealing ability. In particular, this advantage is useful in a low-temperature environment.

Clause 4. The sealing device according to clause 3, wherein the elastic ring has an annular protrusion protruding toward the atmosphere side, wherein the annular protrusion protrudes toward the atmosphere side more than a surface of the oil-side rigid ring on the atmosphere side before the sealing device is assembled, and wherein the annular protrusion is compressed between the oil-side rigid ring and the atmosphere-side rigid ring after the sealing device is assembled in which the oil-side rigid ring is brought into contact with the atmosphere-side rigid ring.

According to this clause, the annular protrusion prevents or reduces ingress of oil between the oil-side rigid ring and the atmosphere-side rigid ring.

Clause 5. The sealing device according to clause 1 or 2, wherein the oil seal is press-fitted into the oil-side rigid ring and secured to the oil-side rigid ring.

6. The sealing device according to clause 3 or 4, wherein the oil seal is press-fitted into the elastic ring and secured to the elastic ring.

According to clauses 5 and 6, if the oil seal is fitted into the oil-side rigid ring or the elastic ring with appropriate pressure, the oil seal can be fixed to the oil-side rigid ring or the elastic ring more firmly than in a case in which the oil seal is glued to the oil-side rigid ring or the elastic ring, and the durability of the sealing device is improved.

REFERENCE SYMBOLS

A: Atmosphere
L: Oil
1: Shock absorber
2: Housing
4: Reciprocating shaft
2A: Shaft hole
6, 60: Sealing device
10: Oil seal
11: Atmosphere-side annular portion
12: Oil-side annular portion
13, 14, 15: Oil lip
13A, 14A, 15A: Lip edge
20: Oil-side rigid ring
30: Elastic ring
31: Inner annular portion
32: Outer annular portion
33: Connecting annular portion
34, 35: Outer gasket portion
37: Atmosphere-side annular portion
38: Oil-side annular portion
39: Annular protrusion
40: Dust seal
41: Dust lip
50: Atmosphere-side rigid ring

The invention claimed is:

1. A sealing device adapted to be disposed between a reciprocating shaft and an inner peripheral surface of a shaft hole in which the reciprocating shaft is disposed, the sealing device separating an oil side from an atmosphere side, the sealing device comprising:

an annular oil seal made of a resin having a plurality of oil lips adapted to be in slidable contact with the reciprocating shaft and having a glass transition temperature of 80 degrees Celsius or higher;

an oil-side rigid ring made of a metal disposed around the annular oil seal and supporting the annular oil seal;

an annular dust seal made of an elastomer and disposed on the atmosphere side of the annular oil seal, the annular dust seal having a dust lip adapted to be in slidable contact with the reciprocating shaft; and an atmosphere-side rigid ring made of a metal disposed around the dust seal and supporting the dust seal.

2. The sealing device according to claim 1, wherein the annular oil seal has an atmosphere-side annular portion and an oil-side annular portion, the oil-side annular portion having a thickness less than that of the atmosphere-side annular portion, the atmosphere-side annular portion adapted to be not in contact with the reciprocating shaft, the oil-side annular portion having the oil lips adapted to be in slidable contact with the reciprocating shaft, each of the oil lips is a circular ring tapering radially inward and having a lip edge, the lip edges of the oil lips being coaxially arranged with each other, a diameter of a lip edge of the oil lip arranged on the oil side being less than a diameter of a lip edge of the oil lip arranged on the atmosphere side in a no-load state in which the annular oil seal is not arranged around the reciprocating shaft.

3. The sealing device according to claim 1, further comprising an elastomeric elastic ring fixedly adhered to an inner periphery of the oil-side rigid ring, an outer periphery of the annular oil seal being attached to the elastic ring.

4. A sealing device adapted to be disposed between a reciprocating shaft and an inner peripheral surface of a shaft hole in which the reciprocating shaft is disposed, the sealing device separating an oil side from an atmosphere side, the sealing device comprising:

an annular oil seal made of a resin having an oil lip adapted to be in slidable contact with the reciprocating shaft and having a glass transition temperature of 80 degrees Celsius or higher;

an oil-side rigid ring made of a metal disposed around the annular oil seal and supporting the annular oil seal;

an annular dust seal made of an elastomer and disposed on the atmosphere side of the annular oil seal, the annular dust seal having a dust lip adapted to be in slidable contact with the reciprocating shaft;

an atmosphere-side rigid ring made of a metal disposed around the dust seal and supporting the dust seal; and an elastomeric elastic ring fixedly adhered to an inner periphery of the oil-side rigid ring, an outer periphery of the annular oil seal being attached to the elastic ring, wherein the elastic ring has an annular protrusion protruding toward the atmosphere side, wherein the annular protrusion protrudes toward the atmosphere side more than a surface of the oil-side rigid ring on the atmosphere side before the sealing device is assembled, and wherein the annular protrusion is compressed between the oil-side rigid ring and the atmosphere-side rigid ring after the sealing device is assembled in which the oil-side rigid ring is brought into contact with the atmosphere-side rigid ring.

5. The sealing device according to claim 4, wherein the annular oil seal is press-fitted into the elastic ring and secured to the elastic ring.

6. The sealing device according to claim 3, wherein the annular oil seal is press-fitted into the elastic ring and secured to the elastic ring.

7. The sealing device according to claim 1, wherein the annular oil seal is press-fitted into the oil-side rigid ring and secured to the oil-side rigid ring.

* * * * *